(12) United States Patent
Arkles et al.

(10) Patent No.: US 8,952,118 B2
(45) Date of Patent: Feb. 10, 2015

(54) DUAL FUNCTIONAL LINEAR SILOXANES, STEP-GROWTH POLYMERS DERIVED THEREFROM, AND METHODS OF PREPARATION THEREOF

(75) Inventors: Barry C. Arkles, Pipersville, PA (US); Jonathan D. Goff, Philadelphia, PA (US)

(73) Assignee: Gelest Technologies, Inc., Morrisville, PA (US)

( * ) Notice: Subject to any disclaimer, the term of this patent is extended or adjusted under 35 U.S.C. 154(b) by 0 days.

(21) Appl. No.: 13/569,638

(22) Filed: Aug. 8, 2012

(65) Prior Publication Data

US 2013/0041098 A1 Feb. 14, 2013

Related U.S. Application Data

(60) Provisional application No. 61/522,999, filed on Aug. 12, 2011.

(51) Int. Cl.
- *C08G 77/20* (2006.01)
- *C08G 77/08* (2006.01)
- *C08G 77/12* (2006.01)

(52) U.S. Cl.
CPC .............. *C08G 77/08* (2013.01); *C08G 77/12* (2013.01); *C08G 77/20* (2013.01)
USPC ............................. 528/25; 524/588; 525/474

(58) Field of Classification Search
CPC ...... C08G 77/04; C08G 77/045; C08G 77/06; C08G 77/12; C08G 77/20
See application file for complete search history.

(56) References Cited

U.S. PATENT DOCUMENTS

| | | | |
|---|---|---|---|
| 4,013,611 A * | 3/1977 | Hechtl et al. .................. 523/212 |
| 4,339,564 A * | 7/1982 | Okamura ........................ 528/15 |
| 4,876,373 A | 10/1989 | Okawa et al. | |
| 5,162,480 A * | 11/1992 | Schilling et al. ................ 528/23 |
| 5,698,654 A * | 12/1997 | Nye et al. ........................ 528/21 |
| 5,965,683 A * | 10/1999 | Nye et al. ........................ 528/31 |
| 6,140,525 A * | 10/2000 | Okawa et al. .................. 556/434 |
| 7,799,888 B2 | 9/2010 | Arkles et al. | |
| 2007/0100109 A1 * | 5/2007 | Hacker et al. .................. 528/31 |
| 2007/0196309 A1 * | 8/2007 | Tarletsky et al. ........... 424/70.12 |
| 2009/0275695 A1 * | 11/2009 | Shen et al. ..................... 524/588 |
| 2009/0297461 A1 * | 12/2009 | Perle et al. ....................... 424/59 |
| 2011/0112497 A1 * | 5/2011 | Shiraishi et al. ............... 604/361 |

FOREIGN PATENT DOCUMENTS

| | | | |
|---|---|---|---|
| DE | 4436076 A1 | 4/1996 | |
| JP | H01-131247 A | 5/1989 | |
| JP | H07-258417 A | 10/1995 | |
| JP | H08-127657 A | 5/1996 | |
| JP | H11-279241 A | 10/1999 | |
| JP | 2005336327 A * | 12/2005 | .............. C08L 83/05 |

OTHER PUBLICATIONS

Yactine et al. "Do-it-yourself functionalized silicones part 2: synthesis by ring opening polymerization of commercial cyclosiloxanes" Polym. Adv. Technol. 2010, 21, 139-149.*
Machine-generated English-language translation of JP-2005336327, translation generated Apr. 2013, 14 pages.*
Shintani et al, "A facile synthesis of hydro- and vinyl-functionalized di- and tetrasiloxanes and polyaddition via hydrosilylation", Polymer Bulletin, vol. 37, pp. 705-710 (1996).
Grunlan et al, "Synthesis of fluorinated copoly(carbosiloxane)s by Pt-catalyzed hydrosilylation copolymerization", Polymer, vol. 44, pp. 981-987 (2003).
Warrick et al, "Silicone Elastomer Developments 1967-1977", Rubber Chemistry and Technology, vol. 52, No. 3, pp. 437-525 (1979).
Dolgov et al, "Organosilicon Liquid Rubbers and Materials Based on them", International Polymer Science and Technology Monograph, No. 1, RAPRA (1975).
Office Action issued Nov. 19, 2013 in JP Application No. 2012-177215.

\* cited by examiner

*Primary Examiner* — Robert S Loewe
(74) *Attorney, Agent, or Firm* — Panitch Schwarze Belisario & Nadel LLP

(57) ABSTRACT

Linear siloxane polymers having low viscosities, precise molecular weights and two distinct polymer termini are provided. Preferred viscosities are greater than 5 cSt and less than 20,000 cSt, and the preferred functionalities at the polymer termini are one hydrogen and one vinyl group, each attached to a silicon atom. Methods for producing such siloxane polymers are also described In the presence of catalysts, such as $Pt^0$ complexes, these siloxanes undergo step-growth polymerization to form elastomers at temperatures below 150° C.

27 Claims, No Drawings

DUAL FUNCTIONAL LINEAR SILOXANES, STEP-GROWTH POLYMERS DERIVED THEREFROM, AND METHODS OF PREPARATION THEREOF

CROSS-REFERENCE TO RELATED APPLICATIONS

This application claims the benefit of U.S. provisional patent Application No. 61/522,999, filed Aug. 12, 2011, the disclosure of which is incorporated herein by reference.

BACKGROUND OF THE INVENTION

The assembly of electrical, optical, and mechanical devices is trending toward smaller dimensions and increased sensitivity to thermal and mechanical stresses during high-speed assembly processes. After assembly, these devices must often be protected from ambient atmospheres, in addition to continued protection from thermal and mechanical stresses. Room temperature vulcanizing (RTV) silicones have traditionally played a significant role in component protection. Desirable performance improvements of silicone RTVs, which are particularly significant at smaller geometries, would include viscosity reduction of the silicone prepolymer, rapid cure at low temperatures and increased mechanical properties.

Room temperature vulcanizing silicone elastomers are documented in a significant amount of literature. (See, for example, E. Warrick et al., *Rubber Chem. Tech.*, 52(3):437 (1979) and O. Dolgov et al., "Organosilicon Liquid Rubbers," *Int'l Poly. Sci. & Techn., Monograph* #1, RAPRA (1975)). More specifically, vinyl-addition silicone RTVs typically cure by a zero valent platinum-catalyzed crosslinking reaction between a telechelic vinyl-functional silicone and a methylhydrosiloxane-dimethylsiloxane copolymer.

The prior art provides no examples of silicone elastomers which are essentially linear structures derived from low molecular weight precursors. This may not be surprising when considering that linear polydimethysiloxanes of molecular weights greater than 400,000 Daltons still manifest liquid behavior, albeit with viscosities greater than 10,000,000 cSt, rather than elastomeric behavior. Most commercial silicones are produced by equilibrium polymerization and polydisperse (PDIs (Mw/Mn) at high molecular weights approaching 3) and >5% residual low molecular weight cyclic and linear siloxanes.

Accordingly, single monomer step-growth polymerization as a strategy to form silicone elastomers has not been pursued. "Single monomer step-growth polymerization" refers to a type of polymerization mechanism in which dual-functional monomers react to first form dimers, then trimers, and eventually long chain polymers. Synthetic polymers produced by step-growth polymerization include polyamides and polyurethanes. Due to the nature of the polymerization mechanism, a high extent of reaction is required to achieve high molecular weight.

Monovinyl terminated siloxanes prepared by living anionic ring-opening polymerization (AROP) are described in DE 44 36 076, but the fact that these polymers are terminated with alkoxysilanes does not allow for the possibility of step growth polymerization. Shintani et al., *Polymer Bulletin*, 37:705-710 (1996) describes the synthesis of a series of dual functional monomers and oligomers by degradative reaction of organolithium reagents with cyclic siloxanes and quenching with a chlorosilane. The term "oligomer" may be understood to mean a molecule containing a few monomer units (ολιγoζ, or oligos, is Greek for "a few"), nominally in a range of 2-6. Monovinyl, monohydride terminated oligomers with 3 monomer units (4 silicon atoms) were prepared by Shintani et al. and self-reacted in the presence of a variety of catalysts.

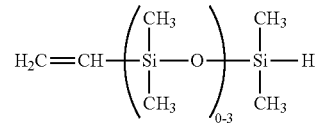

The highest Mn achieved by Shintani was 5400 Daltons, which corresponds to a slightly viscous liquid having a viscosity of 50-100 cSt. The inability to achieve high molecular weights may be due to the fact that the low molecular weight materials have a significant probability of forming cyclic species, especially low molecular weight cyclic species. Alternatively or additionally, loss of even a small portion of hydride termination, perhaps due to oxidation or reaction with water, results in the conversion of these monomers to chain termination species. It may also be possible that Shintani was not able to achieve the high levels of purity necessary for step-growth polymerization because his yield of monomer was low, possibly indicative of reactive byproducts. Effective step-growth polymerization requires an exact 1:1 ratio of vinyl and hydride substitution within one molecule, without any impurity or byproduct reaction that would inhibit or eliminate the ability to form high molecular weight polymers.

Two monomer step-growth polymerization of silicones is a methodology in which a telechelic hydride terminated siloxane is reacted with a telechelic vinyl terminated siloxane in the presence of a Pt catalyst, as exemplified by M. Grunlan et al., *Polymer*, 44:981 (2003). These systems result in chain extension polymers that are typically highly disperse. Grunlan describes molecular weights in the range of 14,000 to 20,000 with PDIs in the range of 1.5 to 3.

In any case, there is little precedent to expect polydimethylsiloxanes of high molecular weight to exhibit elastomeric properties. Non-crosslinked silicones having molecular weights exceeding 500,000 are commonly available and referred to as silicone gums. Unless crosslinked, gums do not behave as elastomers.

SUMMARY OF THE INVENTION

The invention relates to a linear siloxane polymer having one unsaturated group terminus and one hydride group terminus, wherein the siloxane polymer has a degree of polymerization greater than 6, and a ratio of unsaturated group termini to hydride group termini is substantially 1:1.

A method of forming a monovinyl-monohydride terminated siloxane polymer having a degree of polymerization greater than 6 comprises reacting an alkyl or aryl lithium compound with trivinyltrimethylcyclotrisiloxane to form a lithium vinylalkylmethylsilanolate or lithium vinylarylmethylsilanolate, followed by reaction with a strained cyclotrisiloxane and termination with a hydride-containing chlorosilane.

A method of forming a monounsaturated-monohydride terminated siloxane polymer having a degree of polymerization greater than 6 comprises reacting an alkyl or aryl lithium compound with tetramethylcyclotetrasiloxane to form a lithium alkylmethylhydrogensilanolate or lithium arylmethylhydrogensilanolate, followed by reaction with a strained cyclotrisiloxane and termination with an alkyl- or aryl-methylchlorosilane having an unsaturated functionality.

DETAILED DESCRIPTION OF THE INVENTION

The invention relates to dual functional low- to moderate-molecular weight linear siloxane polymers containing one hydride functionality terminus and one unsaturated functionality terminus. The hydride functionality and the unsaturated functionality are each attached to a different silicon atom on opposite ends of the linear siloxane polymer. These materials are liquids having viscosities in the range of about 5 to about 20,000 cSt and low polydispersities. The term "low polydispersity" may be understood to refer to a polydispersity less than about 1.6, more preferably less than about 1.4, most preferably less than about 1.2. The degree of polymerization of the siloxanes is preferably greater than 6, more preferably 6 to about 1000, most preferably about 10 to about 200. It is essential that the dual functional materials have a ratio of substantially 1:1 of unsaturated group termini to hydride group termini within each polymer molecule. The term "substantially 1:1" means that the ratio is within about 5% of 1:1, more preferably within about 3% of 1:1. The ratio of unsaturated group termini to hydride group termini may be estimated based on a combination of $^1$H NMR, GPC, or step-growth polymerization data. The most effective method for achieving this 1:1 ratio is a method of "living" anionic ring-opening polymerization ("living" AROP), described below.

The unsaturated functionality is not particularly limited, and may be, for example, a vinyl, styryl, allyl, methallyl, hexenyl, or octenyl group. The preferred unsaturated functionality is a vinyl group. The siloxane backbone may be, for example, a dialkylsiloxane derived from a cyclotrisiloxane, such as dimethylsiloxane, ethylmethylsiloxane, diethylsiloxane, dimethylsilylethylsiloxane, trifluoropropylmethylsiloxane, or aromatic substituted siloxanes such as diphenylsiloxane or phenylmethylsiloxane. Other possibilities resulting in siloxane-hydrocarbon copolymers consistent with "living" AROP include 2,2,5,5-tetramethyl-2,5-disila-1-oxacyclopentane and related ring-strained systems. A preferred siloxane polymer has a dimethylsiloxane backbone and a vinyl group as the unsaturated functionality, as shown in formula (I):

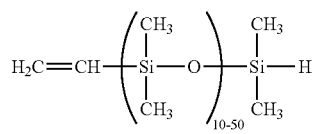

(I)

The monounsaturated-monohydride terminated siloxanes according to the invention are stable, non-flammable liquids of moderate viscosity, which can be transferred by pouring, pumping, or by means of a syringe. The siloxanes according to the invention may be compounded with a variety of reinforcing agents and thixotropic and non-thixotropic fillers, including fumed silica. Monovinylphenyl-terminated siloxanes according to the invention are advantageous due to the ability to control the optical properties (refractive index) and thermal properties.

It is also possible to utilize the monovinyl-monohydride terminated siloxanes as starting materials for the preparation of more complex siloxanes, such as those with norbornene, substituted norbornene, and oxonorbornene termination via a Diels-Adler reaction of the vinyl group with dienes such as cyclopentadiene, methylcyclopentadiene, and furan. Such materials are very attractive because they have the ability to mask a vinyl group. Specifically, when a siloxane such as monomethylnorbornenyl-monohydride terminated polydimethylsiloxane is heated at temperatures greater than about 150° C., it undergoes a reverse Diels-Alder reaction as methylcyclopentadiene is liberated as a volatile by-product, reforming a vinyl terminated siloxane. This is significant because the norbornene-substituted siloxanes are not active with platinum catalysts at room temperature. Thus, it is possible to make a system containing a siloxane and catalyst and store the material at room temperature; heating the material leads to the formation of elastomer without the need for addition of catalyst at the time of use.

The monovinyl-monohydride terminated siloxanes having formula (I) may be prepared by living anionic ring-opening polymerization (AROP). In principle, the reaction may proceed by initiation of the ring opening polymerization of hexamethylcyclotrisiloxane (D3) with vinyl lithium and termination with dimethylchlorosilane (reactions (A) and (B) below), or by initiation of D3 polymerization with lithium dimethylhydrogensilanolate followed by termination with vinyldimethylchlorosilane.

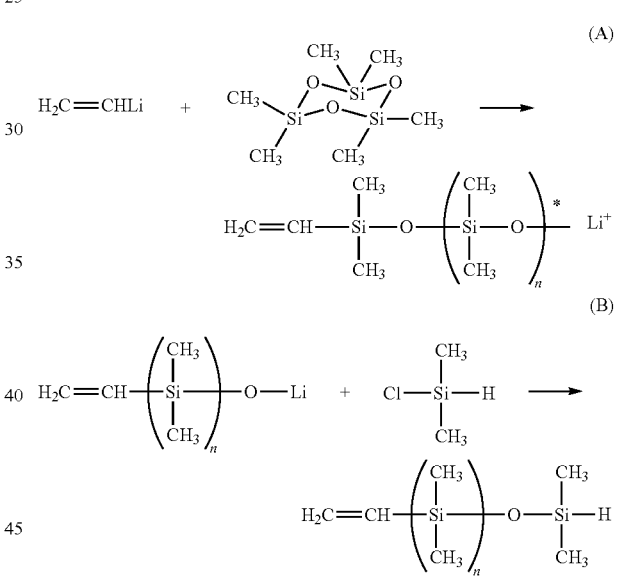

Analogous reactions may be used to prepare siloxane polymers having different backbones or different unsaturated functionalities at the terminus.

The invention thus also relates to methods for synthesizing monounsaturated-monohydride terminated linear siloxanes having degree of polymerization greater than 6 and low polydispersity. As previously explained, the term "low polydispersity" may be understood to refer to a polydispersity less than about 1.6, more preferably less than about 1.4, most preferably less than about 1.2.

A method for synthesizing monovinyl-monohydridel terminated siloxane polymers according to the invention involves reacting an alkyl or aryl lithium (such as methyl lithium, butyl lithium, or phenyl lithium) with trivinyltrimethylcyclotrisiloxane to form a lithium vinylalkylmethylsilanolate or lithium vinylarylmethylsilanolate, followed by reaction with a strained cyclic siloxane and terminating the polymerization with a hydride-containing chlorosilane. A preferred strained cyclic siloxane is hexamethylcyclotrisiloxane; other exemplary strained compounds include, without limitation, (3,3,3-trifluoropropyl)methylcyclotrisiloxane; 2,2,5,5-tetramethyl-2,5-disila-1-oxacyclopentane; triphenyltrimethylcyclotrisiloxane; and hexaphenylcyclotrisiloxane. Hydride-containing chlorosilanes which would be appropriate include, for example, dimethylchlorosilane, phenylmethylchlorosilane, diphenylchlorosilane, and diisopropylchlorosilane; dimethylchlorosilane is presently preferred. By this method, a variety of siloxane polymers may be prepared, including dimethylsiloxanes, trifluoropropylmethylsiloxanes, dimethylsilylethylsiloxanes, phenylmethylsiloxanes, and diphenylsiloxanes.

A second method according to the invention for synthesizing monounsaturated-monohydride terminated siloxane polymers involves reacting an alkyl or aryl lithium (such as methyl lithium, butyl lithium, or phenyl lithium) with tetramethylcyclotetrasiloxane to form lithium methylalkylhydrogensilanolate or lithium methylarylhydrogensilanolate, followed by reaction with a strained cyclic siloxane and terminating the polymerization with an alkyl- or aryl-methylchlorosilane having an unsaturated functionality, such as vinyl or allyl. A preferred strained cyclic siloxane is hexamethylcyclotrisiloxane; other exemplary strained compounds include, without limitation, (3,3,3-trifluoropropyl)methylcyclotrisiloxane; 2,2,5,5-tetramethyl-2,5-disila-1-oxacyclopentane; triphenyltrimethylcyclotrisiloxane; and hexaphenylcyclotrisiloxane. By this method, a variety of siloxane polymers may be prepared, including dimethylsiloxanes, trifluoropropylmethylsiloxanes, dimethylsilylethylsiloxanes, phenylmethylsiloxanes, and diphenylsiloxanes.

These synthetic approaches are attractive because they are "one-pot" syntheses which do not require isolation and purification of intermediates. Appropriate reaction conditions for "living" AROP anionic ring-opening polymerization may be determined by routine experimentation and/or are well known in the art for minimizing chain scrambling and back-biting associated with redistribution of siloxane bonds. Such conditions are also described in U.S. Pat. No. 7,799,888 of Arkles et al., which is herein incorporated by reference in its entirety.

It is believed that the ability to produce siloxane polymers having degree of polymerization greater than 6, which were not achieved previously, is due to the specific steps performed in the polymerization reaction. Standard anionic living AROP consists of three distinct steps: initiation, propagation, and termination. Initiation occurs when the organolithium reagent reacts with the cyclic siloxane. Propagation of the linear siloxane chain is achieved by adding specific polar aprotic 'promoter' solvents to the polymerization mixture. The termination step proceeds when a chlorosilane is added to react with the lithium siloxanolate chain end. Propagation of linear siloxane chains occurs within a specific time frame when the rate of propagation of the cyclic siloxane monomer is faster than the chain scrambling and back-biting side-reactions. Termination needs to occur within that specific time frame to achieve siloxanes with substantially 1:1 ratio of vinyl to hydride and low polydispersity. Outside of this time frame, the redistribution side reactions begin to dominate, resulting in siloxane polymers that resemble equilibration polymerization siloxanes with low molecular weight impurities present. Prior art approaches, such as the method of Shintani, do not include a propagation step during the synthesis, preventing the ability to achieve a degree of polymerization greater than 6. Additionally, no standard 'promoter' is added to the reaction mixture and the time frames of the AROP steps are excessive (1 day), leading to redistribution mechanisms, and explaining why the di- and tetra-siloxanes were recovered with low yields. This approach would not be suitable for making siloxanes with a degree of polymerization greater than 6 with a substantially 1:1 ratio of functional end groups as in the present invention.

Finally, the invention relates to a process for producing elastomers from the siloxanes according to the invention, and to the elastomers thereby produced. The method involves catalyzing compounded or uncompounded siloxanes with a $Pt^0$ catalyst, such as the preferred Karstedt catalyst. In a preferred embodiment, the reaction is performed at a temperature of not greater than about 150° C. A step-growth polymerization based on hydrosilylation commences. Within a few minutes or hours, depending on the temperature, there is a marked increase in viscosity, followed by the transformation of behavior from a liquid to a solid having elastomeric properties. In some cases, the resulting silicone elastomers have no apparent crosslinking, that is, the elastomer is linear. The incorporation of fumed silica or other fillers or reinforcing agents to the elastomers yields compositions having greater mechanical strength. The use of the monounsaturated-monohydride terminated polysiloxanes with low polydispersity and sufficient molecular weight according to the invention reduces the probability of cyclization by a hydrosilylation reaction when forming the elastomers.

Without wishing to be bound by theory, it is believed that the elastomeric behavior achieved in the step-growth polymerization of monounsaturated-monohydride terminated polyalkylsiloxanes described herein results from the elimination of low molecular weight species in this non-equilibrium polymerization and the formation of a polymer having molecular weights presumed to be greater than 100,000 Daltons. Other contributory factors may include the presence of ethane segments (formed by the hydrosilylation of vinyl groups) in the backbone and a polydispersity that is lower than that of silicone gums, which ordinarily have a polydispersity of 3 or greater.

The invention will now be described in connection with the following, non-limiting examples.

Example 1

Comparative Example

This Example replicates the procedure described by Shintani et al., *Polymer Bulletin;* 37:705-710 (1996). 20 g of vinyltetramethyldisiloxane were mixed with 3-4 drops (~0.1 g) of Karstedt catalyst (see Example 1 of U.S. Pat. No. 3,715,334) containing ~2 wt % platinum. Within 3 minutes, an exotherm was observed and the viscosity increased. The mixture was maintained at 50° C. for 4 hours. The mixture increased in viscosity from ~1 cSt to ~50 cSt. After this time, no further increase in viscosity was observed.

Example 2

Synthesis of Monovinyl-Monohydride Terminated Polydimethylsiloxane (DP=200)

A 5 L 4 neck flask equipped with an overhead stirrer, pot thermometer, reflux condenser, and addition funnel was blanketed with nitrogen and charged with 6.9 g (0.027 moles) of trivinyltrimethylcyclotrisiloxane and 110 g of hexane and then sparged with nitrogen for 30 minutes. N-butyl lithium (30 ml of 2.61M in hexane solution) was added to the reaction mixture via an addition funnel over 10 minutes, with an exotherm of 7° C. The mixture was stirred for one hour, during which time the consumption of greater than 95% of the trivinyltrimethylcyclotrisiloxane was observed. A solution of 1158 g (5.2 moles) of hexamethylcyclotrisiloxane in 700 g of hexane was added to the reaction mixture at 20° C., followed by the rapid addition of 145 g of dimethylformamide (DMF). A slight exotherm was observed, pot temperature rose from 20° to 28° C., and the mixture was stirred for one hour.

The capping reaction was accomplished by the addition of 7.7 g (0.081 moles) of dimethylchlorosilane over fifteen minutes. An exotherm was observed. The mixture changed from clear to cloudy and was stirred for an additional 14 hours. Water (300 g) was added to the reaction mixture with stirring and agitated for 90 minutes. The contents of the flask were separated into aqueous and non-aqueous layers in a separatory funnel. The aqueous layer was discarded and the organic phase was washed once with deionized water, once with 5% sodium bicarbonate solution, and once more with deionized water. The last water wash contacting the organic phase remained neutral (pH 7-8). Finally, the organic layer was dried over anhydrous sodium sulfate, filtered, transferred to a rotary evaporator and stripped under 5 mm Hg vacuum to a maximum pot temperature of 100° C. The resulting oil (942 g) had a density of 0.960 g/ml and a viscosity of 290 cSt. GPC data (polystyrene standard without correlation): Mn: 13,000; Mw/Mn: 1.20.

Example 3

Synthesis of Monovinyl-Monohydride Terminated Polydimethylsiloxane (DP=50)

A 5 L 4 neck flask equipped with an overhead stirrer, pot thermometer, reflux condenser, water bath, and addition funnel was blanketed with nitrogen and charged with 39.6 g (0.15 moles) of trivinyltrimethylcyclotrisiloxane and 100 g of hexane and then sparged with nitrogen for 30 minutes. Methyl lithium (140 ml of 3.22M in diethoxymethane solution) was added to the reaction mixture via an addition funnel over 15 minutes. After an exotherm of 5° C. was observed, a cooling bath was used to maintain temperature below 40° C. during the methyl lithium addition. The mixture was stirred for one hour, during which time the consumption of greater than 95% of the trivinyltrimethylcyclotrisiloxane was observed. At the end of this period, the cooling bath was allowed to warm and the temperature of the reaction mixture was allowed to return to 25° C. Subsequently, a solution of 1671 g (7.5 moles) of hexamethylcyclotrisiloxane in 1025 g of hexane was added, followed by the rapid addition of 186 g of dimethylformamide (DMF). A slight exotherm was observed, pot temperature rose from 24° to 33° C., and the mixture was stirred for one hour.

The capping reaction was accomplished by the addition of 45 g (0.47 moles) of dimethylchlorosilane over fifteen minutes. An exotherm was observed. The mixture changed from clear to cloudy and was stirred for an additional 17 hours. Water (500 g) was added to the reaction mixture with stirring and agitated for 90 minutes. The contents of the flask were separated into aqueous and non-aqueous layers in a separatory funnel. The aqueous layer was discarded and the organic phase was washed once with deionized water, once with 5% sodium bicarbonate solution, and once more with deionized water. The last water wash contacting the organic phase remained neutral (pH 7-8). The organic layer was dried over anhydrous sodium sulfate, filtered, transferred to a rotary evaporator, and stripped under 5 mm Hg vacuum to a maximum pot temperature of 100° C. The resulting oil (1732 g) had a density of 0.960 g/ml and a viscosity of 49 cSt. GPC data (polystyrene standard without correlation): Mn: 4370; Mw/Mn: 1.20.

Example 4

Synthesis of Monovinyl-Monohydride Terminated Polydimethylsiloxane (DP=10)

A 5 L 4 neck flask equipped with an overhead stirrer, pot thermometer, reflux condenser, water bath, and addition funnel was blanketed with nitrogen and charged with 141.4 g (0.547 moles) of trivinyltrimethylcyclotrisiloxane and 80 g of hexane and then sparged with nitrogen for 30 minutes. Methyl lithium (500 ml of 3.22M diethoxymethane solution) was added to the reaction mixture via an addition funnel over 45 minutes. After an exotherm of 5° C. was observed, a cooling bath was used to maintain the temperature below 40° C. during the methyl lithium addition. The mixture was stirred for 1.5 hours, during which time the consumption of greater than 95% of the trivinyltrimethylcyclotrisiloxane was observed. At the end of this period, the cooling bath was allowed to warm and the temperature of the reaction mixture was allowed to return to 25° C. Subsequently, a solution of 1202.5 g (5.40 moles) of hexamethylcyclotrisiloxane in 736 g of hexane was added, followed by the rapid addition of 380 g of dimethylformamide (DMF). A slight exotherm was observed, pot temperature rose from 26° to 31° C., and the mixture was stirred for one hour.

The capping reaction was accomplished by the addition of 155 g (1.64 moles) of dimethylchlorosilane over fifteen minutes. An exotherm was observed. The mixture changed from clear to cloudy and was stirred for an additional 18 hours. Water (500 g) was added to the reaction mixture with stirring and agitated for 90 minutes. The contents of the flask were separated into aqueous and non-aqueous layers in a separatory funnel. The aqueous layer was discarded and the organic phase was washed once with deionized water, once with 5% sodium bicarbonate solution, and once more with deionized water. The last water wash contacting the organic phase remained neutral (pH 7-8). The organic layer was dried over anhydrous sodium sulfate, filtered, transferred to a rotary evaporator and stripped under 3 mm Hg vacuum to a maximum pot temperature of 100° C. The resulting oil (1304 g) had a density of 0.93 g/ml and a viscosity of 8.4 cSt. GPC data (polystyrene standard without correlation): Mn: 1170; Mw/Mn: 1.38.

Example 5

Synthesis of Monovinylphenylmethyl-Monohydridebutylmethyl Terminated Polydimethylsiloxane (DP=20)

A 5 L 4 neck flask equipped with an overhead stirrer, pot thermometer, reflux condenser, water bath, and addition funnel was blanketed with nitrogen and charged with 23.7 g (0.099 moles) of tetramethylcyclotetrasiloxane and 100 g of hexane and then sparged with nitrogen for 30 minutes. The reaction mixture was cooled to 0° C. with an ice-water cooling bath. N-butyl lithium (150 ml of 2.61M in hexanes solution) was added to reaction mixture via an addition funnel over 15 minutes. Ice was added to the cooling bath during the n-butyl lithium addition to control the exotherm and maintain a pot temperature below 5° C. The mixture was stirred for one hour, during which time the consumption of greater than 95% of the tetramethylcyclotetrasiloxane was observed. At the end of this period, the cooling bath was allowed to warm and the temperature of the reaction mixture was allowed to return to 20° C. Subsequently, a solution of 580 g (2.6 moles) of hexamethylcyclotrisiloxane in 300 g of hexane was added, followed by the rapid addition of 310 g of tetrahydrofuran (THF). A slight exotherm was observed, and the reaction mixture was heated to 40° C. with a heating mantle and stirred for 3 hours.

The capping reaction was accomplished by the addition of 75.4 g (0.41 moles) of vinylphenylmethylchlorosilane over 25 minutes. An exotherm was observed and the heating mantle was removed. The mixture changed from clear to cloudy and was stirred for an additional 16 hours. Water (200 g) was added to the reaction mixture with stirring and agitated for 90 minutes. The contents of the flask were separated into aqueous and non-aqueous layers in a separator)/funnel. The aqueous layer was discarded and the organic phase was washed once with deionized water, once with 5% sodium bicarbonate solution and once more with deionized water. The last water wash contacting the organic phase remained neutral (pH 7-8). The organic layer was dried over anhydrous sodium sulfate, filtered, transferred to a rotary evaporator, and stripped under 5 mm Hg vacuum to a maximum pot temperature of 100° C. The resulting oil (596 g) had a density of 0.960 g/ml and a viscosity of 20 cSt. GPC data (polystyrene standard without correlation): Mn: 1650; Mw/Mn: 1.30.

Example 6

Synthesis of Monoallyl-Monohydride Terminated Polydimethylsiloxane (DP=50)

A 5 L 4 neck flask equipped with an overhead stirrer, pot thermometer, reflux condenser, water bath, and addition funnel was blanketed with nitrogen and charged with 15.8 g (0.066 moles) of tetramethylcyclotetrasiloxane and 255 g of hexane, and then sparged with nitrogen for 30 minutes. The reaction mixture was cooled to 0° C. with an ice-water cooling bath. N-butyl lithium (100 ml of 2.61M in hexane solution) was added to reaction mixture via an addition funnel over 30 minutes. Ice was added to the cooling bath during the n-butyl lithium addition to control the exotherm and maintain a pot temperature below 5° C. The mixture was stirred for one hour, during which time the consumption of greater than 95% of the tetramethylcyclotetrasiloxane was observed. At the end of this period, the cooling bath was replaced with a heating mantle and a solution of 966 g (4.3 moles) of hexamethylcyclotrisiloxane in 404 g of hexane was added, followed by the rapid addition of 106 g of dimethylformamide (DMF). A slight exotherm was observed, and the reaction mixture was heated to 45° C. with a heating mantle and stirred for one hour.

The capping reaction was accomplished by the addition of 39.9 g (0.30 moles) of allyldimethylchlorosilane over 40 minutes. An exotherm was observed and the heating mantle was removed. The mixture changed from clear to cloudy and was stirred for an additional 18 hours. Water (200 g) was added to the reaction mixture with stirring and agitated for 90 minutes. The contents of the flask were separated into aqueous and non-aqueous layers in a separatory funnel. The aqueous layer was discarded and the organic phase was washed once with deionized water, once with 5% sodium bicarbonate solution, and once more with deionized water. The last water wash contacting the organic phase remained neutral (pH: 7-8). The organic layer was dried over anhydrous sodium sulfate, filtered, transferred to a rotary evaporator, and stripped under 5 mm Hg vacuum to a maximum pot temperature of 100° C. The resulting oil (880 g) had a density of 0.960 g/ml and a viscosity of 69 cSt. GPC data (polystyrene standard without correlation): Mn: 4630, Mw/Mn: 1.58.

Example 7

Synthesis of Monomethylnorbornenyl-Monohydride Terminated Polydimethylsiloxane (DP=50)

A 1 L 4 neck flask equipped with an overhead stirrer, pot thermometer, reflux condenser, and heating mantle was charged with 278 g of monovinyl-monohydride terminated polydimethylsiloxane (DP=50), as described in Example 3, and 11 g (0.068 mol) of methyldicyclopentadiene. The reaction mixture was stirred and heated to 190° C. for 6 hours under a blanket of nitrogen. The reaction mixture was allowed to cool to 100° C. and stripped under 0.6 mm Hg vacuum. The resulting oil (279 g) had a density of 0.960 g/ml and a viscosity of 48 cSt. GPC data (polystyrene standard without correlation): Mn: 4260; Mw/Mn: 1.30.

Example 8

Elastomer Formation from Monovinyl-Monohydride Terminated Polydimethylsiloxane 20 g of monovinyl-monohydride terminated polydimethylsiloxane (DP=50) as described in Example 3 were mixed with 3-4 drops (~0.1 g) of Karstedt catalyst containing 2 wt % platinum. Within 3 minutes an exotherm was observed. The mixture was maintained at a temperature of 50° C. Within 20 minutes a clear, tough elastomeric body formed. Measurement of molecular weights during the cure process before the elastomer became intractable was achieved by quenching small portions of the reaction mixture with a hydrosilylation catalyst poison. A molecular weight of greater than 200,000 daltons was measured for the incomplete polymerization. Rheological measurement of the cure at 50° C. at 0.5% strain and 1 Hz demonstrated tand at 5-6 minutes.

Example 9

Elastomer Formation from Monovinyl-Monohydride Terminated Polydimethylsiloxane Filled with 10 wt % HMDZ Treated Fumed Silica 20 g of monovinyl-monohydride terminated polydimethylsiloxane (DP-=50) as described in Example 3 were mixed with 2 g of hexamethyldisilazane treated fumed silica with a surface area of 150-200 m$^2$/g. The viscosity of the mixture was ~100 cSt. After mixing with 3-4 drops (~0.1 g) of Karstedt catalyst containing 2 wt % platinum, an exotherm was observed within 3 minutes. The mixture was maintained at 50° C. in an oven for ~30 minutes. A translucent, tough elastomeric body formed.

Example 10

Elastomer Formation from Monovinyl-Monohydride Terminated Polydimethylsiloxane Filled with 30 wt % HMDZ Fumed Silica 20 g of monovinyl-monohydride terminated polydimethylsiloxane (DP=50) as described in Example 3 were mixed with 8.5 g of hexamethyldisilazane treated fumed silica with a surface area of 150-200 m$^2$/g. The viscosity of the mixture was ~10,000 cSt. After mixing with 3-4 drops (~0.1 g) of Karstedt catalyst containing 2 wt platinum, an exotherm was observed within 3 minutes. The mixture was maintained at 50° C. in an oven for ~30 minutes. A translucent, tough elastomeric body formed.

Example 11

Elastomer Formation from Monovinylphenyl-Monohydride Terminated PDMS 20 g of monovinylphenyl-monohydride terminated polydimethylsiloxane (DP=20) (as described in Example 5) was mixed with 3-4 drops (~0.1 g) of Karstedt catalyst containing 2 wt % platinum. Within 3 minutes an exotherm was observed. The mixture was maintained at a temperature of 50° C. Within 20 minutes a clear, tough elastomeric body formed.

Example 12

Elastomer formation from Monomethylnorbornenyl-Monohydride Polydimethylsiloxane 20 g of monomethylnorbornenyl-monohydride terminated polydimethylsiloxane (DP=50) as described in Example 7 were mixed with 3-4 drops (~0.1 g) of Karstedt catalyst containing 2 wt % platinum. The viscosity increased from 48 cSt to 130 cSt over 12 hours at room temperature, then remained unchanged over 60 hours. The mixture was heated to 190° C. under 1 mm Hg vacuum. Within 4 hours a clear silicone with elastomeric properties was recovered.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A linear siloxane polymer having one unsaturated group terminus and one hydride group terminus, wherein the siloxane polymer has a degree of polymerization of at least 20 and a polydispersity less than about 1.2, and wherein a ratio of unsaturated group termini to hydride group termini is substantially 1:1.

2. The siloxane polymer according to claim 1, wherein the degree of polymerization is at least 20 to about 1000.

3. The siloxane polymer according to claim 2, wherein the degree of polymerization is about 20 to about 200.

4. The siloxane polymer according to claim 1, wherein the unsaturated group is selected from the group consisting of vinyl, styryl, allyl, methallyl, hexenyl, and octenyl.

5. The siloxane polymer according to claim 1, wherein the siloxane backbone is selected from the group consisting of diphenylsiloxane, phenylmethylsiloxane, trifluoropropylmethylsiloxane, dimethylsilylethylsiloxane, and alkylmethylsiloxane.

6. The siloxane polymer according to claim 5, wherein the siloxane backbone is dimethylsiloxane and the unsaturated group is vinyl.

7. The siloxane polymer according to claim 1, wherein the polymer has a viscosity of about 20 to about 20,000 cSt.

8. The siloxane polymer according to claim 1, wherein the polymer is isolated from a reaction mixture.

9. A method of forming a monovinyl-monohydride terminated siloxane polymer having a degree of polymerization greater than 6 comprising reacting an alkyl or aryl lithium compound with trivinyltrimethylcyclotrisiloxane to form a lithium vinylalkylmethylsilanolate or lithium vinylarylmethylsilanolate, followed by reaction with a strained cyclic siloxane and termination with a hydride-containing chlorosilane.

10. The method according to claim 9, wherein the alkyl or aryl lithium compound is selected from the group consisting of methyl lithium, butyl lithium, and phenyl lithium.

11. The method according to claim 9, wherein the strained cyclic siloxane is selected from the group consisting of hexamethylcyclotrisiloxane; (3,3,3-trifluoropropyl)methylcyclotrisiloxane; 2,2,5,5-tetramethyl-2,5-disila-1-oxacyclopentane; triphenyltrimethylcyclotrisiloxane; and hexaphenylcyclotrisiloxane.

12. The method according to claim 9, wherein the monovinyl-monohydride terminated siloxane polymer has a polydispersity less than about 1.6.

13. The method according to claim 9, wherein the hydride-containing chlorosilane is selected from the group consisting of dimethylchlorosilane, phenylmethylchlorosilane, diphenylchlorosilane, and diisopropylchlorosilane.

14. A method of forming a monounsaturated-monohydride terminated siloxane polymer having a degree of polymerization greater than 6 comprising reacting an alkyl or aryl lithium compound with tetramethylcyclotetrasiloxane to form a lithium alkylmethylhydrogensilanolate or lithium arylmethylhydrogensilanolate, followed by reaction with a strained cyclic siloxane and termination with an alkyl- or aryl-methylchlorosilane having an unsaturated functionality.

15. The method according to claim 14, wherein the unsaturated functionality is vinyl or allyl.

16. The method according to claim 14, wherein the alkyl or aryl lithium compound is selected from the group consisting of methyl lithium, butyl lithium, and phenyl lithium.

17. The method according to claim 14, wherein the strained cyclic siloxane is selected from the group consisting of hexamethylcyclotrisiloxane; (3,3,3-trifluoropropyl)methylcyclotrisiloxane; 2,2,5,5-tetramethyl-2,5-disila-1-oxacyclopentane; triphenyltrimethylcyclotrisiloxane; and hexaphenylcyclotrisiloxane.

18. The method according to claim 14, wherein the monounsaturated-monohydride terminated siloxane polymer has a polydispersity less than about 1.6.

19. A linear elastomeric product having no apparent crosslinking, wherein the product is formed from a linear siloxane polymer having one unsaturated group terminus and one hydride group terminus, wherein the siloxane polymer has a degree of polymerization of at least 20 and a ratio of unsaturated group termini to hydride group termini is substantially 1:1.

20. The elastomeric product according to claim 19, wherein the linear siloxane polymer is a monovinyl-monohydride terminated polysiloxane.

21. The elastomeric product according to claim 19, wherein the product is formed via hydrosilylation step-growth polymerization of the linear siloxane polymer.

22. The elastomeric product according to claim 19, wherein the linear siloxane polymer is uncompounded or compounded with a reinforcing agent or filler.

23. A method of producing an elastomeric product according to claim 19, comprising reacting the siloxane polymer with a $Pt^0$ catalyst.

24. The method according to claim 23, further comprising compounding the siloxane polymer with a filler or reinforcing agent prior to reaction with the $Pt^0$ catalyst.

25. The method according to claim 24, wherein the filler is fumed silica.

26. The method according to claim 23, wherein the linear siloxane polymer is a monovinyl-monohydride terminated polydimethylsiloxane.

27. The method according to claim 23, wherein the reaction with the catalyst is performed at a temperature of not greater than about 150° C.

* * * * *